United States Patent
Teixeira

(10) Patent No.: US 12,210,613 B2
(45) Date of Patent: Jan. 28, 2025

(54) DETECTION AND PREVENTION OF REVERSE ENGINEERING OF COMPUTER PROGRAMS

(71) Applicant: CAPZUL LTD, London (GB)

(72) Inventor: Marcio Coelho Teixeira, Belo Horizonte (BR)

(73) Assignee: CAPZUL LTD, London (GB)

( * ) Notice: Subject to any disclaimer, the term of this patent is extended or adjusted under 35 U.S.C. 154(b) by 441 days.

(21) Appl. No.: 17/441,614

(22) PCT Filed: Mar. 23, 2020

(86) PCT No.: PCT/IB2020/052696
§ 371 (c)(1),
(2) Date: Sep. 21, 2021

(87) PCT Pub. No.: WO2020/188546
PCT Pub. Date: Sep. 24, 2020

(65) Prior Publication Data
US 2022/0335118 A1    Oct. 20, 2022

Related U.S. Application Data

(60) Provisional application No. 62/821,828, filed on Mar. 21, 2019.

(51) Int. Cl.
*G06F 21/52* (2013.01)
*G06F 21/14* (2013.01)
(Continued)

(52) U.S. Cl.
CPC .............. *G06F 21/52* (2013.01); *G06F 21/14* (2013.01); *H04L 9/0825* (2013.01); *H04L 9/14* (2013.01); *G06F 2221/033* (2013.01)

(58) Field of Classification Search
CPC .... G06F 21/52; G06F 21/14; G06F 2221/033; G06F 21/64; G06F 8/30; H04L 9/0825;
(Continued)

(56) References Cited

U.S. PATENT DOCUMENTS 6,668,325 B1    12/2003    Collberg et al.
7,353,499 B2    4/2008    De Jong
(Continued)

FOREIGN PATENT DOCUMENTS

CN    112311534 A  *  2/2021  ........... H04L 9/0825
WO    WO-2009108245 A2    9/2009

OTHER PUBLICATIONS

Kang, James Jin, Kiran Fahd, and Sitalakshmi Venkatraman. "Trusted Time-Based Verification Model for Automatic Man-in-the-Middle Attack Detection in Cybersecurity." Cryptography 2.4 (2018): 38. DOI: 10.3390/cryptography2040038.
(Continued)

*Primary Examiner* — Benjamin E Lanier
*Assistant Examiner* — Rupali Dhakad
(74) *Attorney, Agent, or Firm* — Perry + Currier

(57) ABSTRACT

Various techniques to detect and prevent reverse engineering of computer programs are disclosed. A program may be used as a key in an asymmetric cryptographic scheme, where modification of the program would destroy its usefulness as a key. An operator may be dispersed among different lines of code, so that unauthorized insertion or removal of lines of code causes the code to fail. Content of memory may be hashed at different times to detect unauthorized memory access. Code may be modified and hashes computed and compared to hashes expected from such modification. A duration of execution may be measured and compared to an expected duration, where deviation from expected may indicated unauthorized modification of code. Variables may
(Continued)

be mapped according to a secret agreed logic to thwart eavesdropping. A program may be made labyrinthine and complex, so that its useful flow paths are difficult to discern.

8 Claims, 16 Drawing Sheets

(51) Int. Cl.
*H04L 9/08* (2006.01)
*H04L 9/14* (2006.01)

(58) Field of Classification Search
CPC ....... H04L 9/14; H04L 9/3247; H04L 9/3239; H04L 9/0866
See application file for complete search history.

(56) References Cited

U.S. PATENT DOCUMENTS

| | | |
|---|---|---|
| 7,508,938 B1 | 3/2009 | Ignaszewski |
| 7,836,121 B2 | 11/2010 | Elgressy et al. |
| 7,996,685 B2 | 8/2011 | Jin et al. |
| 8,387,022 B2 | 2/2013 | Horning et al. |
| 8,522,349 B2 | 8/2013 | Crume |
| 8,713,326 B2 | 4/2014 | Horne et al. |
| 9,111,072 B1 | 8/2015 | Thai |
| 9,912,681 B1 | 3/2018 | Ismael et al. |
| 2005/0071655 A1 | 3/2005 | de Jong |
| 2008/0148062 A1* | 6/2008 | Ekberg ................ H04W 12/069 713/187 |
| 2010/0011344 A1 | 1/2010 | Guterman |
| 2011/0035601 A1 | 2/2011 | Davidson et al. |
| 2012/0030268 A1* | 2/2012 | Liu ........................ H03K 3/84 708/254 |
| 2015/0294114 A1 | 10/2015 | Monahan et al. |
| 2015/0379290 A1* | 12/2015 | Shinke ..................... G06F 8/70 726/28 |
| 2016/0218872 A1 | 7/2016 | Anderson |
| 2017/0322800 A1* | 11/2017 | Mitchell ................ H04W 4/60 |

OTHER PUBLICATIONS

Sherman, Alan T., et al. "Chaum's protocol for detecting man-in-the-middle: Explanation, demonstration, and timing studies for a text-messaging scenario." Cryptologia 41.1 (2017): 29-54. DOI:
Sherman, Alan T., et al. "Chaum's protocol for detecting man-in-the-middle: Explanation, demonstration, and timing studies for a text-messaging scenario." Cryptologia 41.1 (2017): 29-54.
Schrittwieser, Sebastian, and Stefan Katzenbeisser. "Code obfuscation against static and dynamic reverse engineering." International workshop on information hiding. Springer, Berlin, Heidelberg, 2011. DOI: https://doi.org/10.1007/978-3-642-24178-9_19.
Aziz, Benjamin, and Geoff Hamilton. "Detecting man-in-the-middle attacks by precise timing." 2009 Third International Conference on Emerging Security Information, Systems and Technologies. IEEE, 2009. DOI: 10.1109/SECURWARE.2009.20.

\* cited by examiner

DETECTION AND PREVENTION OF REVERSE ENGINEERING OF COMPUTER PROGRAMS

CROSS-REFERENCE TO RELATED APPLICATION

This application claims priority to and the benefit of U.S. provisional patent application Ser. No. 62/821,828, filed Mar. 21, 2019, which is incorporated herein by reference.

BACKGROUND

Maintaining the integrity of computer programs is a concern in an age where malicious code may be easily inserted into computer programs or into network communications between computer programs.

Parties with malicious intent may reverse engineer computer programs to steal data or impersonate legitimate parties. As computer technologies become more widespread and complex, it is becoming increasingly difficult to secure computer systems against such attacks.

SUMMARY

According to an aspect of the present disclosure, a non-transitory computer readable medium is provided including instructions to generate a plurality of different computer programs using code and a source of randomization, the plurality of different computer programs providing the same functionality. Further including instructions to generate a plurality of keys using the plurality of computer programs as corresponding keys according to an asymmetric cryptographic scheme. Further including instructions to distribute the plurality of computer programs to different computer devices to provide for encrypted communications using the keys and the plurality of computer programs as the corresponding keys.

According to another aspect of the present disclosure, a non-transitory computer readable medium is provided including instructions to obtain a key from a line of code of a computer program. Further including instructions to combine the key with a partial operator in another line of code of the computer program to create a complete operator. Further including instructions to execute an expected operation using the complete operator.

According to another aspect of the present disclosure, a non-transitory computer readable medium including instructions to request that a computer program perform a computation. Further including instructions to receive an indication of an actual duration of execution of the computation. Further including instructions to compare the actual duration of execution to an expected duration of execution. Further including instructions to determine that the computer program has been modified when the actual duration deviates from the expected duration.

According to another aspect of the present disclosure, a non-transitory computer readable medium including instructions to execute a computer program. Further including instructions to write data to a computer memory space as part of execution of the computer program. Further including instructions to hash the memory space to obtain a current hash. Further including instructions to compare the current hash to a previous hash of the memory space. Further including instructions to continue execution of the computer program if the current hash and the previous hash are identical.

According to another aspect of the present disclosure, a non-transitory computer readable medium including instructions to map a server variable to first external variable. Further including instructions to communicate the first external variable over a network to a computer program, wherein the computer program is to map the first external variable to a client variable to perform an operation with the client variable. Further including instructions to re-map the server variable to a second external variable. Further including instructions to communicate the second external variable over the network to the computer program, wherein the computer program maps the second external variable to the client variable to perform another operation with the client variable.

According to another aspect of the present disclosure, a method of verifying software code using modified hashes, the method including modifying the software code on a client device into a modified code. The method further including creating a hash based on the modified code. The method further including sending the hash based on the modified code to a server. The method further including comparing the hash based on the modified code to at least one hash on a predetermined list of hashes on the server. The method further including if in response to determining that the hash based on the modified code does not match with at least one hash on the predetermined list of hashes on the server, sending a negative response to the client device to stop any transactions. The method further including if in response to determining that the hash based on the modified code does match with at least one hash on the predetermined list of hashes on the server, sending a position response to the client device to proceed with any transactions.

According to another aspect of the present disclosure, a non-transitory computer-readable medium including instructions executable by a processor to modify a software code into a modified code. Further including instructions to create a hash based on the modified code. Further including instructions to send the hash based on the modified code to a server. Further including instructions to receive a confirmatory response on whether to continue transactions using the software code.

According to another aspect of the present disclosure, a non-transitory computer-readable medium including instructions executable by a processor to receive a hash based on a modified code. Further instructions to compare the hash based on the modified code to at least one hash on a predetermined list of hashes. Further instructions if in response to determining that the hash based on the modified code does not match with at least one hash on the predetermined list of hashes, send a negative response to stop any pending transactions. Further instructions if in response to determining that the hash based on the modified code does match with at least one hash on the predetermined list of hashes, send a positive response to proceed with any transactions.

According to another aspect of the present disclosure, a non-transitory computer-readable medium including instructions executable by a processor to receive a variable. Further including instructions to pass the variable through a series of functions that change a value of the variable. Further including instructions to send the variable and the value to a server. Further including instructions to receive a confirmatory response on whether to continue transactions using the software code.

DETAILED DESCRIPTION

This disclosure provides various techniques to reduce the effectiveness of reverse engineering of computer programs. These techniques may be used singly or in various combinations, and it is contemplated that a several techniques used together will complement each other to provide robust protection that will be difficult to overcome. A computer device, system, or network that implements these techniques will have improved operation in that it will be more difficult to disrupt and provide greater security to data.

Figure 1:
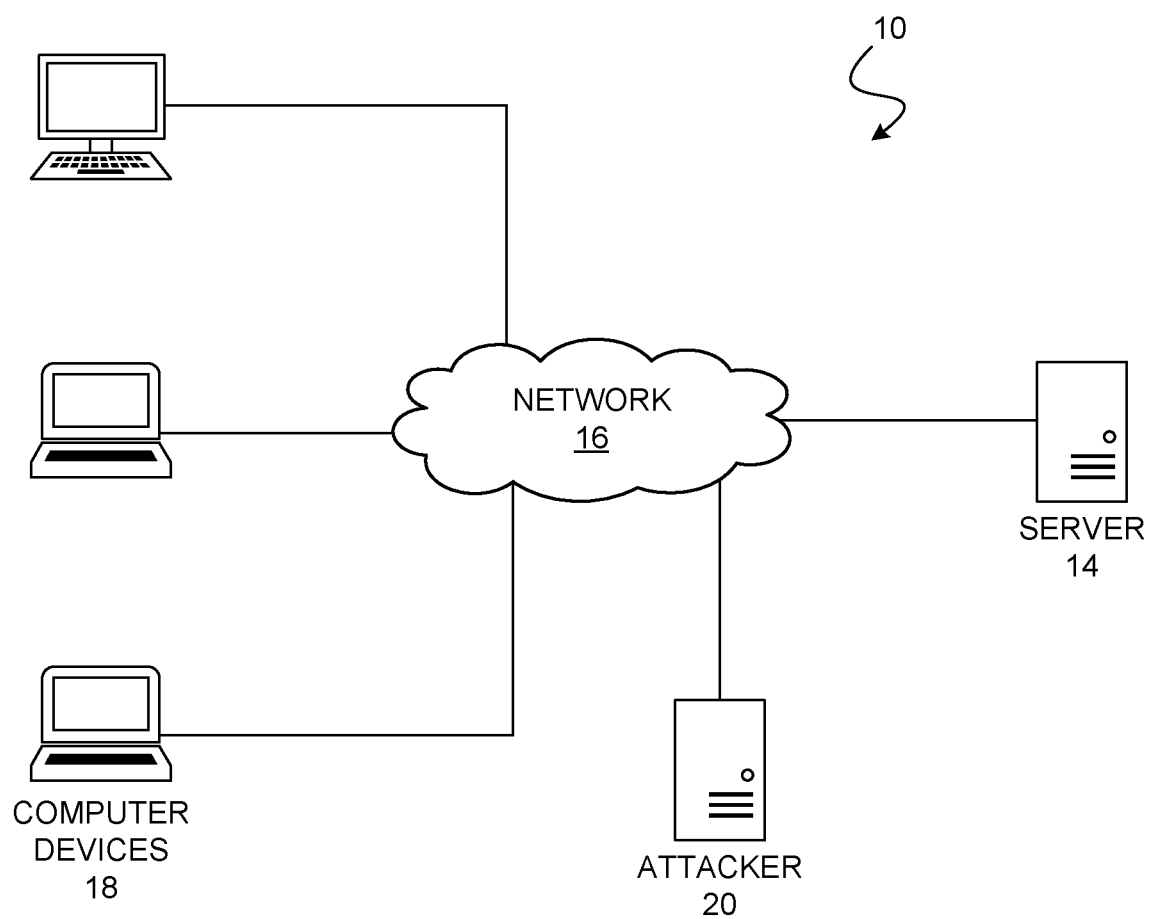
FIG. 1 is a diagram of a networked computer system.

FIG. 1 shows an example system 10. The system 10 includes a server 14 and a plurality of computer devices or client devices 18 connected via a computer network 16. The client computer device 18 and server 14 are intended to communicate information with one another vis the computer network 16.

The computer devices 18 may be operable by a plurality of users. The computer devices 18 may include notebook computers, smartphones, desktop computers, servers, or any other computer device operable by a user. And number of computer devices 18 may be provided.

The server 14 is used to communicate data with the computer devices 18 for an intended purpose. Examples of servers include messaging servers, email servers, web servers, database servers, hosting servers, social network servers, secure file servers, enterprise servers, and the like. Any number of servers 14 may be provided.

The computer network 16 may include a wide-area network (WAN), a local-area network (WAN), the internet, or a combination of such. The computer network 16 may provide wired and/or wireless connectivity.

An attacker computer device 20, such as a man-in-the-middle attacker or spoofer, may attempt to impersonate a client computer device 18, modify communications between a client computer device 18 and the server, modify program code exchanged between a client computer device 18 and the server 14, eavesdrop, or otherwise disrupt communications. The attacker computer device 20 may be operated by a human, i.e., a hacker, but this type of threat is becoming less of a risk to modern secure systems. What is a greater risk is that the attacker computer device 20 may operate an autonomous program that attempts to probe and attack numerous computer devices 18 and servers 14. Such programs may use artificial intelligence (AI) techniques to find holes in security, mimic programs at the computer devices 18 and/or server 14, and perform similar attacks.

The techniques discussed herein aim to reduce the likelihood of success of the attacker computer device 20, slow down the activities of the attacker computer device 20, and/or thwart and confound potential attacks, so that the client computer devices 18 and server 14 may communicate in a secure and efficient manner, as intended.

Figure 2:
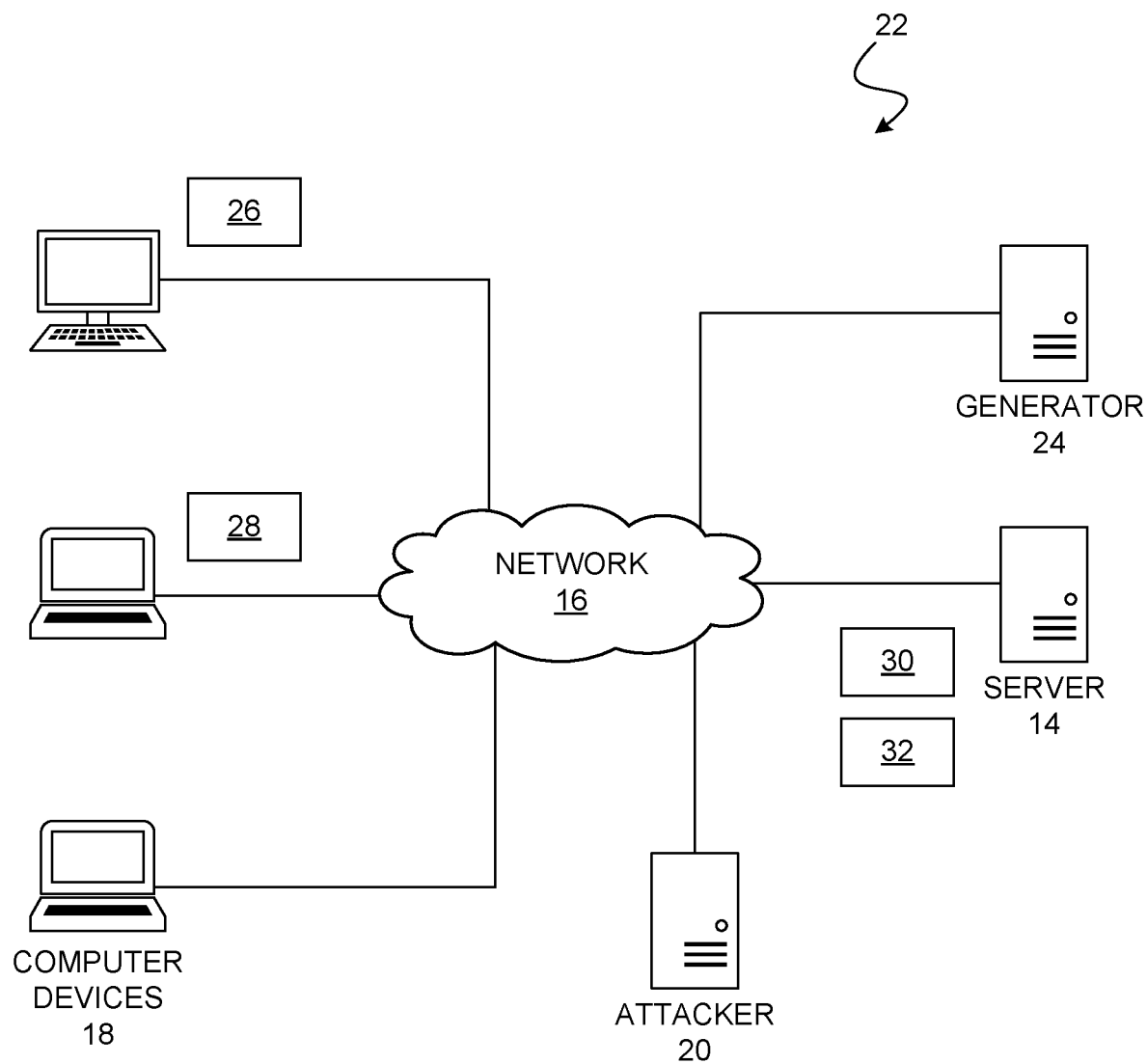
FIG. 2 is a diagram of a networked computer system, in which client-side computer programs function as cryptographic keys.

FIG. 2 shows an example system 22. The system 22 is substantially the same as the system 10 of FIG. 1, except as discussed below.

The system 22 includes a generator 24 for generating a plurality of different computer programs 26, 28 that have the same general functionality. The generator 24 may be operated by a server connected to the computer network 16.

Each computer program 26, 28 is distributed to a different client computer device 18. In this example, the computer programs 26, 28 provide data communications functionality with the server 14 to achieve a desired functionality. However, the computer programs 26, 28 are different and may be unique. As such, each computer device 26, 28 may have a unique copy of the same general program.

The generator 24 generates the computer programs 26, 28 and may also distribute the computer programs 26, 28 to the client computer devices 18. Alternatively, the generator 24 provides the computer programs 26, 28 to the server 14, which distributes the computer programs 26, 28 to the client computer devices 18. The generator 24 may include a program that is executed at the server 14. The generator 24 may include separate server that is connected to the server 14 via a secure connection.

Program code that has an executable or other programmatic function may be used as a cryptographic key. This may allow a modification of the program code to be detected based on the result of the cryptographic process. For example, if a program is modified (even by changing one bit), its use as a key will very likely fail.

The computer programs 26, 28 can be used a private keys in an asymmetric cryptographic scheme. Corresponding public keys 30, 32 may be generated by the generator 24 and provided to the server 14. The server 14 and each client computer device 18 thus possess a respective shared secret that can be used to verify that a computer program 26, 28 has not been modified. The computer program 26, 28 can itself provide communications functionality to the server 14 and cryptographic functionality to verify that its has not been modified.

For example, the server 14 may instruct a computer program 26 at a client computer device 18 to decrypt encrypted data using the computer program 26 as a key. The server 14 previously encrypted the data using the public key corresponding to the computer program 26 as private key. Hence, if the computer program 26 has not been modified, the computer program 26 can be used as the private key to successfully decrypt the data. If the computer program 26 has been modified, then decryption will most likely fail. As such, encrypted data communications can be implemented.

In other examples, the data is test data that the server 14 uses to verify the integrity of the computer program 26. The computer device 18 should thereby provide the decrypted expected data to the server 14, so that the server 14 can determine that the computer device 18 can be trusted. If the returned test data is not as expected, then the server 14 may determine that the computer program 26 has been modified. The server 14 can then take appropriate action, such as alerting the operator of the computer device 18, blocking communications, and so on.

For example, an attacker 20 may intercept a copy of the computer program 26 and modify it, so as to insert eavesdropping code or other malicious code in an attempt to disrupt secure communications between the computer device 18 and the server 14. The attacker 20 may try to modify the computer program 26 as operated by the computer device 18, so that the computing device 18 may share secure information with the attacker 20. However, since any modification of the computer program 26 will virtually always destroy the program's capability to act as the private key corresponding to the public key 30 held by the server 14, such modification will prevent the decryption of data encrypted by the public key. Further, such modification is readily detectable by the server 14.

Figure 3:
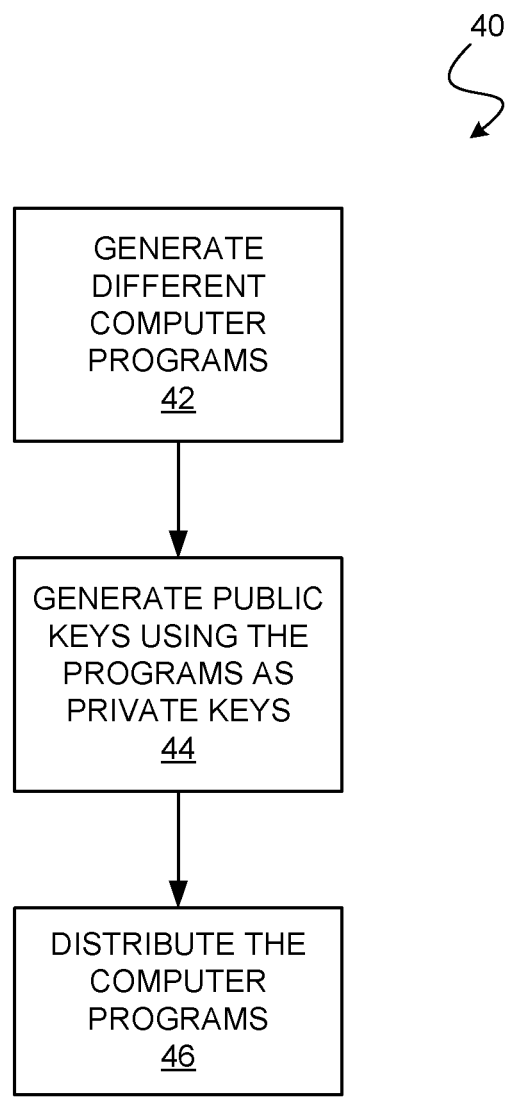
FIG. 3 is a flowchart of a method of generating and distributing instances of client-side computer programs that function as cryptographic keys.

FIG. 3 shows a method 40 of generating and distributing programs to be used as private keys for integrity checking. The method 40 may be implemented by instructions stored at a non-transitory computer-readable medium and operable by a processor. The method 40 may be performed by the generator 24 and/or server 14.

At block 42, a plurality of computer programs is generated using code and a source of randomization. The code may be written by a software programmer to fulfill an intended purpose. The code may be source code that is compiled, bytecode that is executable on a virtual machine, an executable file that is executable on a real machine, or an interpreted program that is executable by an interpreter. Block 42 may include salting the intended code with randomness and then compiling the salted code to obtain an instance of a computer program. This may be done any number of times to obtain different, and potentially unique, instances of the computer program.

The source of randomization may introduce randomness to different instances of the computer program by randomizing an instruction set, randomizing function/variable names, adding dummy functions/variables, modifying code without changing effect (e.g., changing "if x>10 then do something" to "if x<=10 then do nothing, else do something"), or similar.

As such different versions of the same program are generated. The different versions are functionality the same but are nonetheless different. The different versions may be unique. However, various different versions may be reused if the reduced security can be tolerated.

At block 44, a plurality of public keys is generated using the plurality of computer programs as private keys. A private key and public key pair is thus generated and may be used for asymmetric cryptography to verify that a computer program has not been modified.

At block 46, the plurality of computer programs may be distributed to different computer devices to provide for use in communications with a server or other functionality. The corresponding public keys may be provided to the server. In various examples, each end user receives a unique computer program or file, which is distinguishable from every other computer program or file that has been generated.

The functionality provided by the computer program may then be carried out. For example, in an encrypted communications example, messages are encrypted at the computer device using the computer program itself as the private key and then transmitted to the server. Incoming messages received from the server, and encrypted by the public key, are received and decrypted by the computer program which uses itself as the private key.

In other examples, the private key is held by the server and the computer program acts as a public key.

Figure 4:
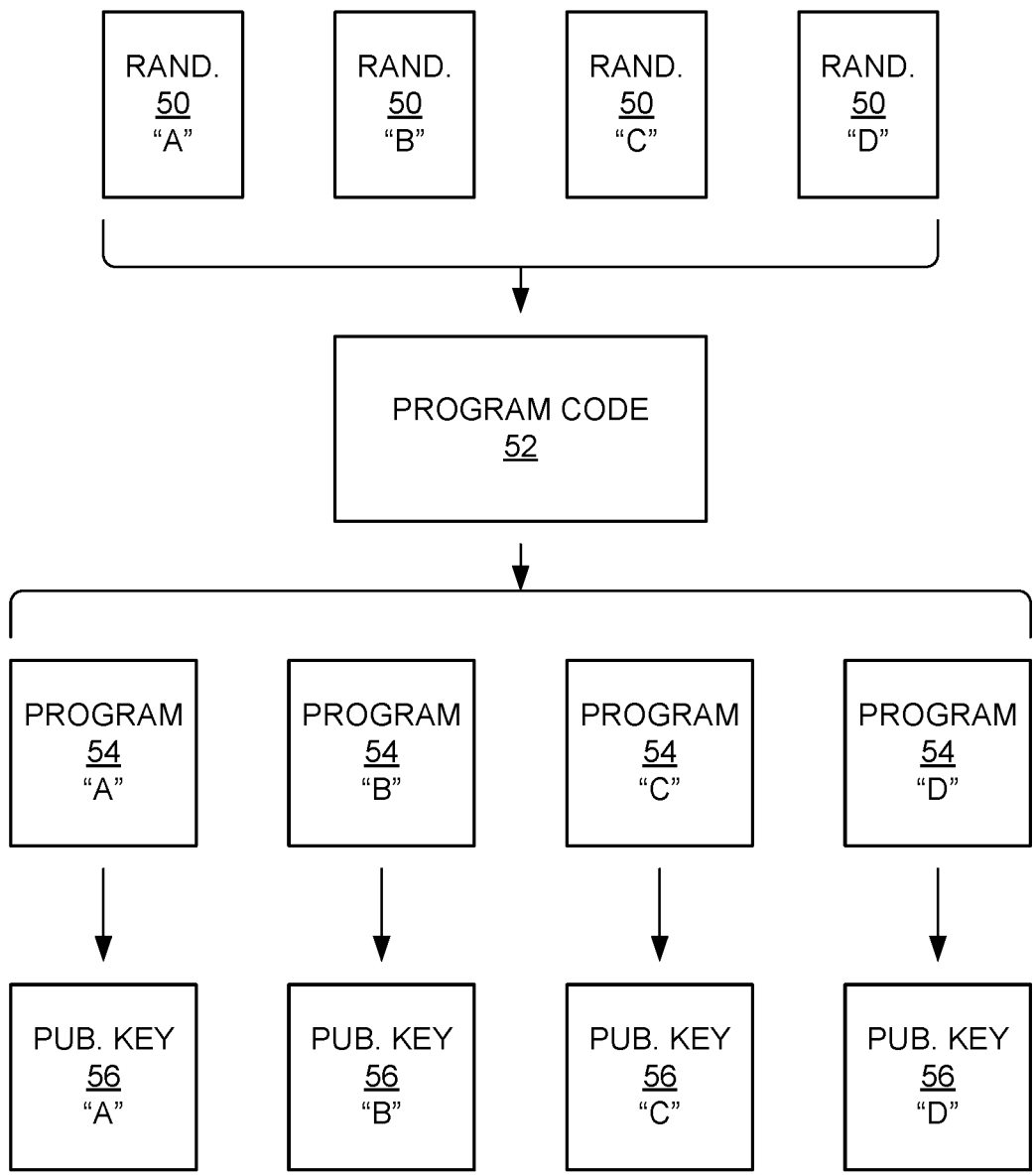
FIG. 4 is a diagram of instances of client-side computer programs that function as cryptographic keys with server-side keys.

As shown in FIG. 4, random information 50 may be combined with functional program code 52 to obtain various different or unique instances or versions of the program 54. Each program instance 54 may be considered a private key and may be used to generate a corresponding public key.

Each computer program instance 54, while different or unique in the sense of its generation, may perform the same function. For instance, an example of a computer program 52 may be an encrypted messaging platform, which may be supported by a server 14 (FIG. 2). Each instance 54 of the program may perform the same messaging functionality (e.g., send and receive messages, store messages, insert attachments, etc.) with somewhat different code. Each computer program instance 54 may include bytecode that is executable on a virtual machine, an executable file that is executable on a real machine, or an interpreted program that is executable by an interpreter.

The above-described technique may be used to detect unauthorized modification to a program instance 54. For example, a program instance 54 may be sent a query that is generated based on the corresponding public key 56. The program instance 54 should be able to properly respond to the query using itself as the private key. Hence, if the program instance 54 cannot properly respond to the query, then the querying party may determine that the program instance 54 has been compromised. In the example of an encrypted communications system, it could be that a malicious user has modified the program instance 54 in an effort to hack the encrypted communications system. However, because the program instance 54 was modified, it cannot function as the expected private key. Failure of program instance 54 to be able to respond to a query based on the public key 56 informs the encrypted communications system that the program instance 54 can no longer be trusted.

Figure 5:
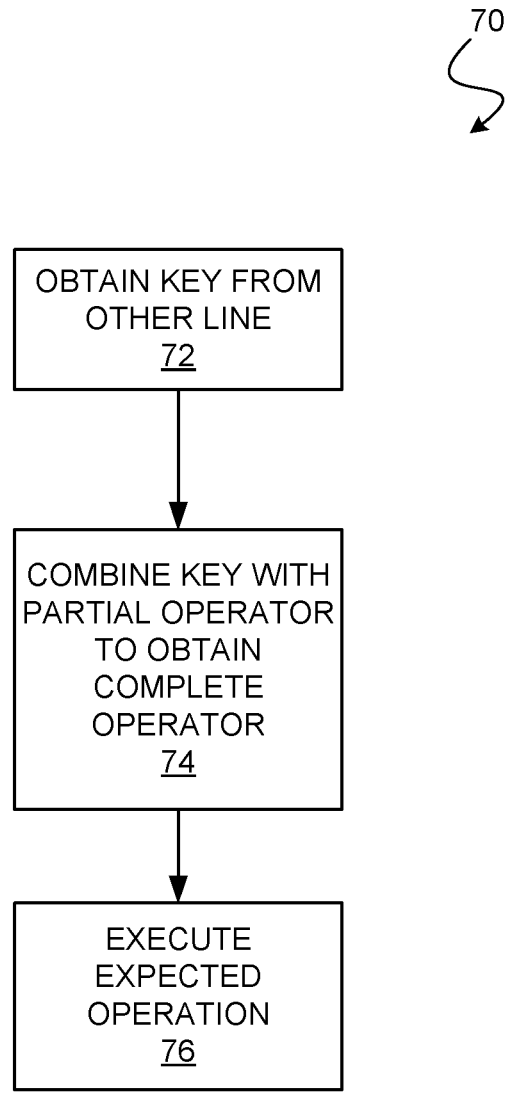
FIG. 5 is a flowchart of a method of completing partial operators using keys in different lines of code.

FIG. 5 shows another technique that may be used to verify integrity of code in a computer program. This technique spreads programmatic operators or instructions among different lines of code. A method 70 that implements this technique may be performed at a computer program executed by a client computer device 18, as shown in FIG. 1. The method 70 may be implemented by instructions stored at a non-transitory computer-readable medium and operable by a processor. The method 70 may be performed by the client computer device 18 and, more specifically, by a virtual machine at the client computer device 18.

Each lines of a computer program may include only a partial operator, in addition to any operands. A different line, such as a preceding line, may contain a key to complete the partial operator. The method 70 begins with such a program.

At block 72, for the current line of code being executed, a preceding line of code is referenced. A key from the preceding line is obtained.

At block 74, the obtained key is combined with the partial operator at the current line to obtain a complete operator.

At block 76, the expected operation of the current line is carried out, using an operands present.

In the example below, a program snippet is written with partial operators "42" and "36" and operands "16" and "12." Further included are keys "10" and "5." As such, each line of code includes a partial operator, a key, and an operand, if appropriate.

42 10 16
36 5 12

During execution, the partial operator "36" is combined with the key "10" from the preceding line of code. Combination of such may use any function, such as a logical operation (XOR, AND, OR), summation, or similar. For explanatory purposes, partial operator "36" and key "10" are added to obtain a true operator "46," which is then executed on operand "12" to perform the intended function.

A sequence of lines of code thus configured provide security in the sense that each line depends on another line in order to obtain the correct operator. Any insertion or deletion of a line of code, so as to insert eavesdropping code or circumvent security measures, would disrupt the sequence and result in incorrect operators. A modification to an operator in line of code would also likely disrupt the sequence if the key in the other line is not also changed.

It should be noted that it is not necessary for a line to depend on an immediately preceding line, as it may instead depend a line that is two lines removed, three lines removed, or distant according to some deterministic function.

This technique may protect code from being maliciously or otherwise tampered with as a perpetrator would not be able to insert additional lines of code (or remove lines) into the entirety of the program, without disrupting the expected sequence of keys and partial operators.

Figure 6:
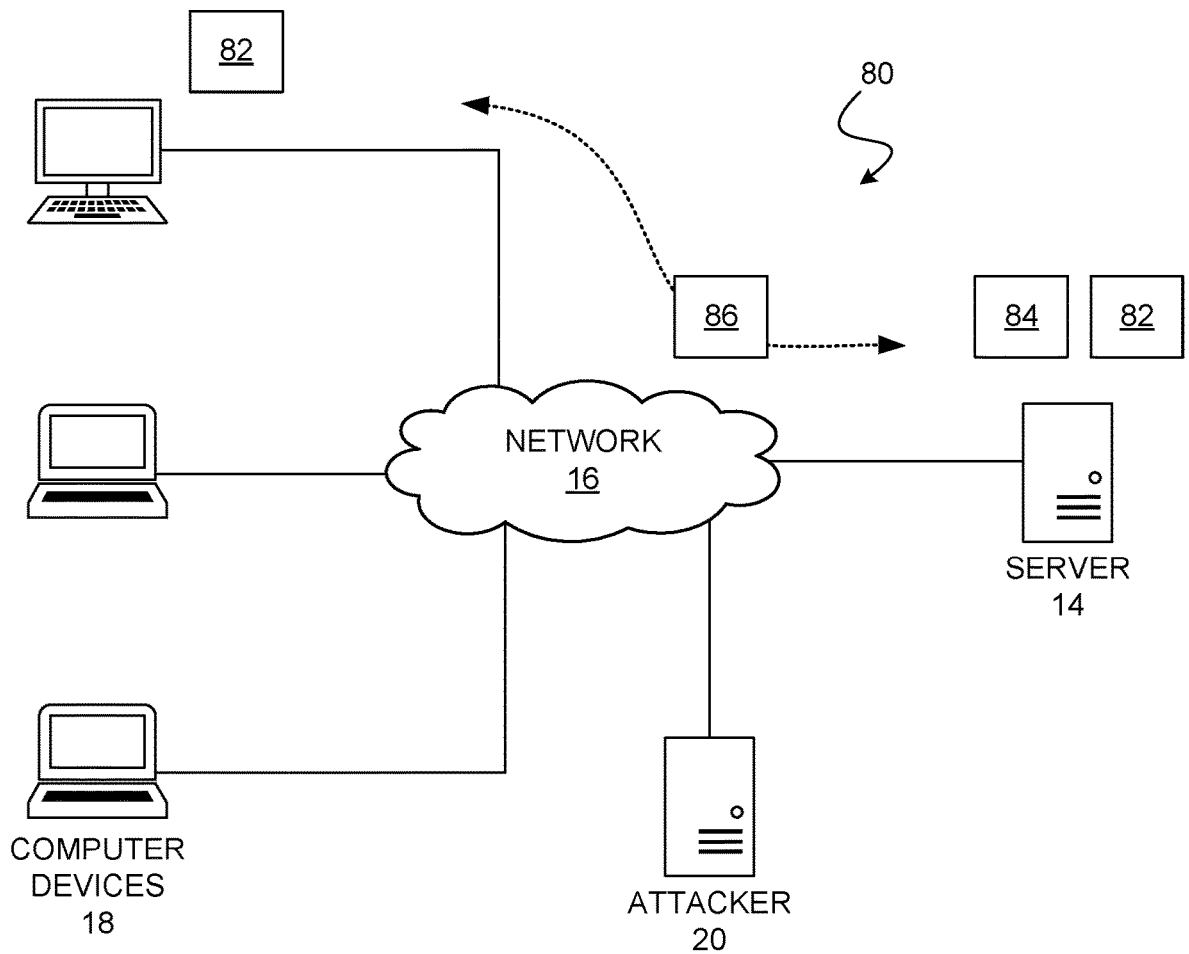
FIG. 6 is a diagram of a networked computer system, in which time taking to execute code is used to determine whether a program has been compromised.

Another technique is illustrated in FIG. 6. The time taken to execute program operations may be used to detect whether the program has been compromised. This technique may be implemented by instructions stored at a non-transitory computer-readable medium and operable by a processor.

A computer program 82 is provided at a client computer device 18. The computer program 82 interacts with another computer program 84 at a server 14, so as to implement desired functionality, such as encrypted communications among other examples discussed herein. The client-side program 82 and server-side program 84 may communicate data 86 back and forth to provide the functionality.

The client-side computer program 82 may have know or measured time of execution for specific functions or other blocks of code. If the code is modified, then the time of execution may change significantly. As such, time of execution at the client computer device 18 may be used to determine whether the client-side computer program 84 has been modified.

Quantification of expected time of execution of various blocks of code may be performed by the server 14 or another secure computer device.

Time of execution for a block of code may depend on parameters provided to code and may also depend on the hardware and runtime environment. The server 14 may have a copy of the computer program 82 and may determine time of execution for the computer program 82. The server 14 may simulate the hardware and runtime environment of the client-side computer program 82 and measure the time of execution of a block of code of the computer program 82. The server 14 may also provide the same or similar parameters to its copy of the computer program 82 as the client computer device 18 provides, or is expected to provide, to the client copy of the computer program 82. Hence, the server 14 can determine an expected time of execution for a portion of the computer program 82.

Quantification of expected time of execution may be performed in real time, for example, at the server 14, as the client is also executing the computer program 82. Quantification of expected time of execution may be performed in advance.

In various examples, the computer program 82 is profiled for different hardware and runtime environments, different parameters, and/or other conditions that significantly affect time of execution. A matrix of times of execution may be constructed, from which the server 14 can look up an expected time of execution for a certain set of circumstances, when needed.

The computer program 82 at the client computer device 18 may measure and report to the server 14 time of execution for a block of code. The server 14 may compare the time of execution to an expected time of execution, as measured by server simulation or as previously quantified. If the actual reported time of execution deviates significantly from the expected, then the server 14 may determine that the computer program 82 at the client computer device 18 has been modified or otherwise compromised. A threshold deviation may be used, such as 10% off expected time, 20% off expected time, or similar.

Figure 7A:
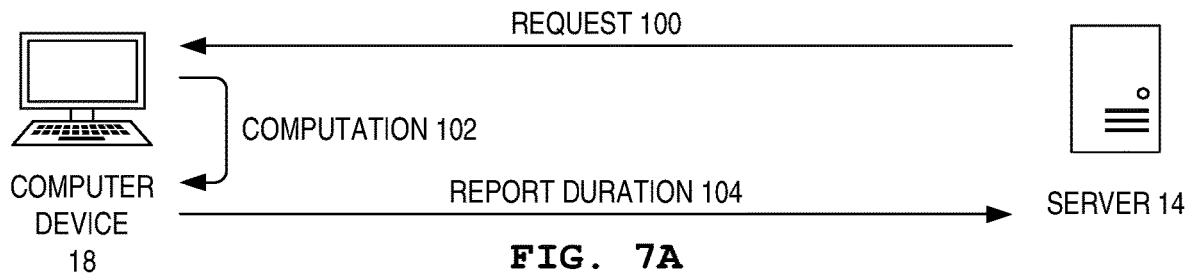
FIGS. 7A-7D are diagrams of various methods of measuring execution time of program code.
Figure 7B:
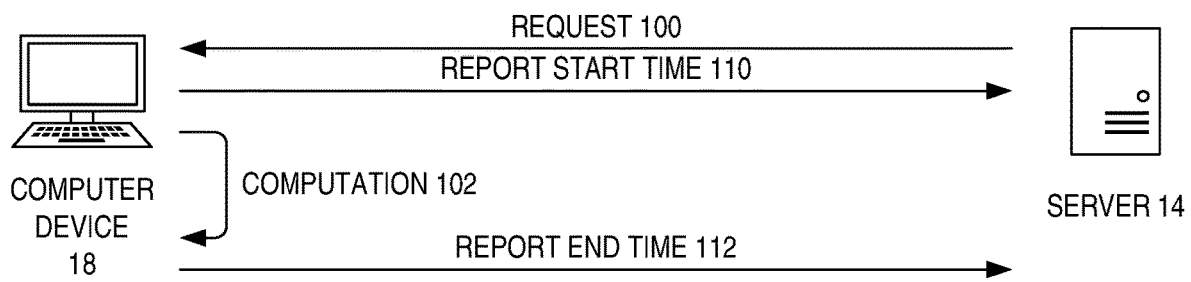
Figure 7C:
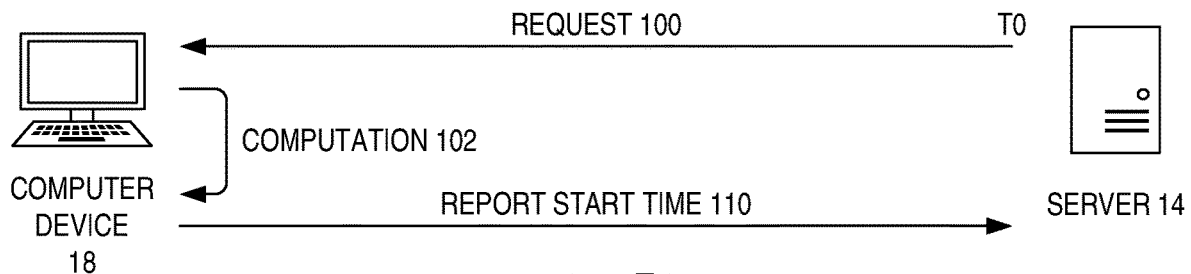
Figure 7D:
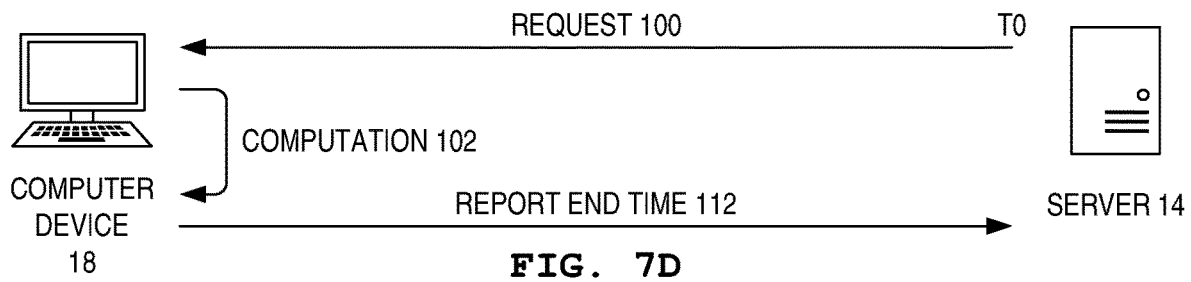

The computer program 82 may report a time of execution as a duration, a timestamp, or other indication of duration of execution. In some examples, as shown in FIG. 7A, the computer program 82 uses a timer or clock to measure duration of execution of a block of code and directly reports the duration 104 to the server 14, in response to a request 100 from the server 14 to perform the computation 102. In other examples, as shown in FIG. 7B, the computer program 82 reports a start time 110 and an end time 112 of code execution, as timestamps, and the server 14 computes the duration taken. In still other examples, as shown in FIG. 7C, the client-side computer program 82 reports a start time 112 for execution of the block of code, when execution is complete, and the end time may be computed by the server 14 based on the time T0 that the server 14 made the request and a known or measured latency for data communications between the server 14 and the computer device 18. Latency may be taken as the difference between T0 and the start time 116 reported by the client-side computer program 82 and may be assumed to not change significantly during the process. That is, the request 100 made by the server 14 may be used to measure latency. In a similar example, as shown in FIG. 7D, the client computer device 18 reports end time 112, when the computation is complete, and the server 14 infers start time from time of request T0 and latency measured as the difference between the reported end time and the time that the server 14 received such. Some of these examples may require clock synchronization, or at least a known difference, between the server 14 and the client computer device 18.

A reported timestamp or duration may be obfuscated, hashed, or encrypted.

For example, the server-side computer program 84 may instruct the client-side computer program 82 to perform a computation with a parameter provide by the server-side computer program 84. The server-side computer program 84 may know or be able to compute the expected time of execution for the computation by the client-side computer program 82. The client-side computer program 82 performs the computation and responds to the server-side computer program 84. The response may include a duration for the computation that the server-side computer program 84 can compare to the expected duration of execution. Alternatively, the response may include a timestamp indicating the time that the client-side computer program 82 began the computation. The server-side computer program 84 may compute network latency from the difference between the received timestamp and the time that the server-side computer program 84 made the request. The server-side computer 84 may thus compute the duration of execution at the client-side computer program 82 by subtracting the round latency from the total roundtrip time. A similar computation may be performed if the client-side computer program 82 returns a timestamp indicating the end of the computation.

The latency of communications of data 86 may be knowable or measurable.

The server 14 can thus compare an expected time of execution with an actual time of execution as reported by the client computer device 18 or as inferred from communications with the client computer device 18, without the client computer needing to report a timestamp or duration. The server 14 can compensate for latency in communications of data 86 by, for example, subtracting a measured or approximate latency from a round trip communication initiated at the server 14.

For example, the server 14 may instruct the computer program 82 at the client computer device 18 to compute a value with a given set of starting parameters. The server 14 may provide the same set of parameters to its copy of the computer program 82 and measure the time of execution to be, for instance, 150 ms. If the network latency is 100 ms from server 14 to computer device 18 and 100 ms back again, then the server 14 can expect a total time of 350 ms for the computer program 82 at the client computer device 18 to return the requested value. A threshold may be used to determine whether the actual total time, as measured by the server 14, is within expected. For example, a threshold of 50 ms may be used. Hence, if the measure time is less than 300 ms or greater than 350 ms, then the server 14 may determine that the computer program 82 has been modified or compromised.

Network latency measurements can be time averaged, so that sudden changes in latency can be compensated.

The function or other block of code used to check duration of execution may be specifically designed to take a significant amount of time, so as to reduce error that may be introduced by fluctuations in latency, variance among different client computers 18, and similar factors.

The function or other block of code used to check duration of execution may provide desired functionality to the computer program 82. The code may be used to perform a function that takes significant time. The code may be purposely designed to take longer than necessary. The function or other block of code used to check duration of execution may be used for no other purpose than to verify integrity of the computer program 82 via duration of execution.

Figure 8:
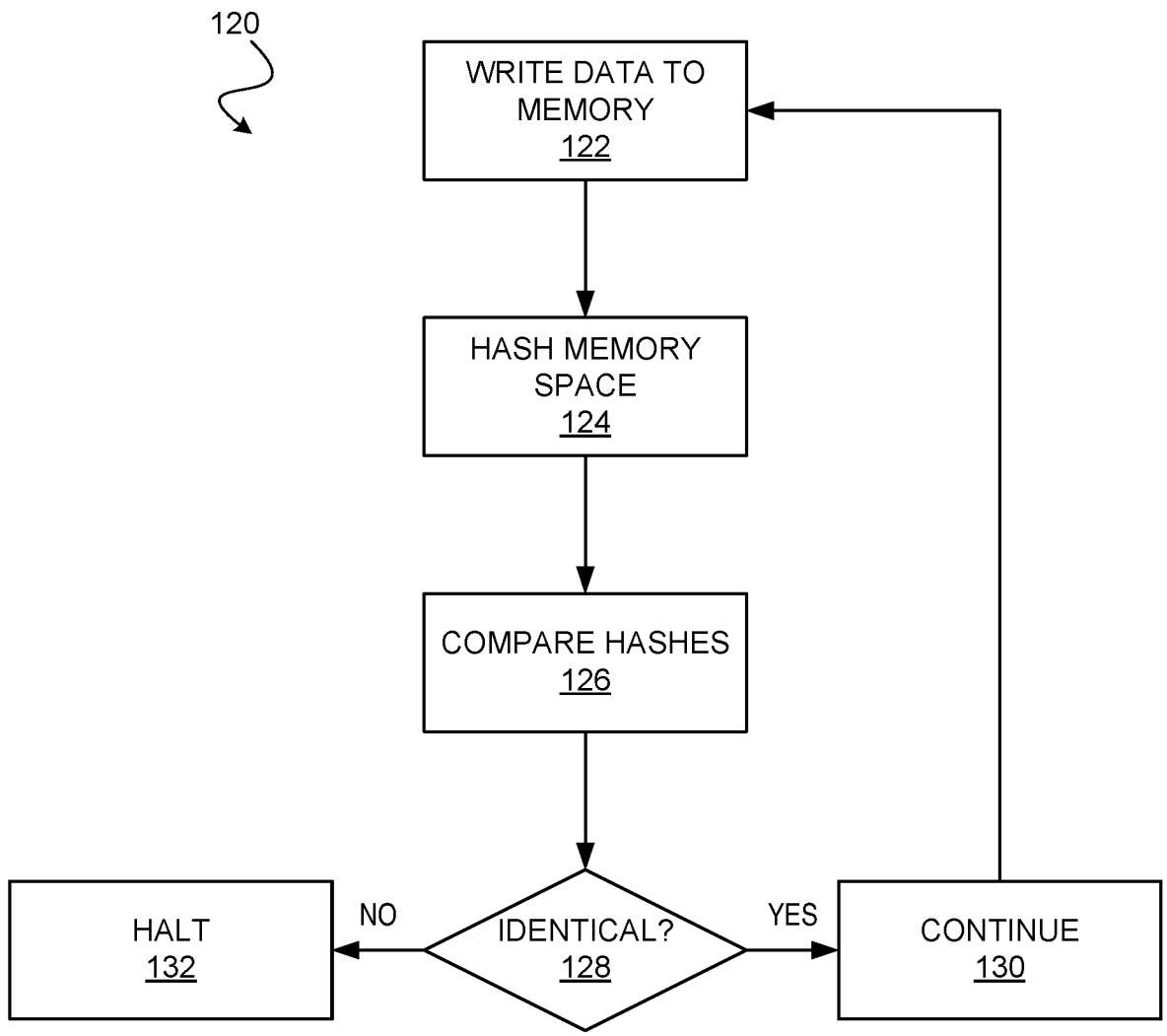
FIG. 8 is a flowchart of a method of comparing hashes of memory space at times when memory content is not expected to change.

Another technique is illustrated in FIG. 8. This technique hashes memory space used by a computer program and checks for discrepancies that may indicate modification of the computer program. A method 120 that implements this technique may be performed at a computer program executed by a client computer device 18, as shown in FIG. 1. The method 120 may be implemented by instructions stored at a non-transitory computer-readable medium and operable by a processor. The method 120 may be performed by the client computer device 18 and, more specifically, by a virtual machine at the client computer device 18.

When a computer program is being executed, it may from time to time write data to memory (e.g., RAM, hard drive, etc.), at block 122, to provide its intended functionality.

At block 124, a hash can be computed for the memory space used to this store data. Any suitable hashing algorithm may be used, such as MD5, SHA-3, BLAKE2, CRC (cyclic redundancy check), or similar.

At block 126, the current hash value is compared to a previous hash value for the same memory space. The comparison is made at a time after the current hash value and before the computer program would normally be expected to write data to the memory space. As such, the current and previous hashes values are expected to be identical. If the hashes are not identical, then it may be that the computer program has been modified to write data to memory outside the expected timeframe or it may be that its memory space is being written to by another program.

If the hash values are determined to be identical, at block 128, then the program continues, at block 130. If the hashes values are determined to be different, then the program may be halted, at block 132, and/or other action may be taken in view of the likely unauthorized modification of the program.

This technique may provide protection against malicious tampering to program code or its memory space. By modifying the contents of the program's memory space, a malicious actor would therefore change the current hash. As such, the expected hash match would not occur and the program or its operator would be alerted to the problem.

The timing of blocks 124 and 126 with respect to the program's normal operations should be set so that no change to the memory space is excepted. Further, the memory space that is hashed may be the entire memory space used by the program, a subset of such memory space, or a block of memory that is selected randomly, perhaps at runtime, so as to reduce the cost of this check.

Figure 9:
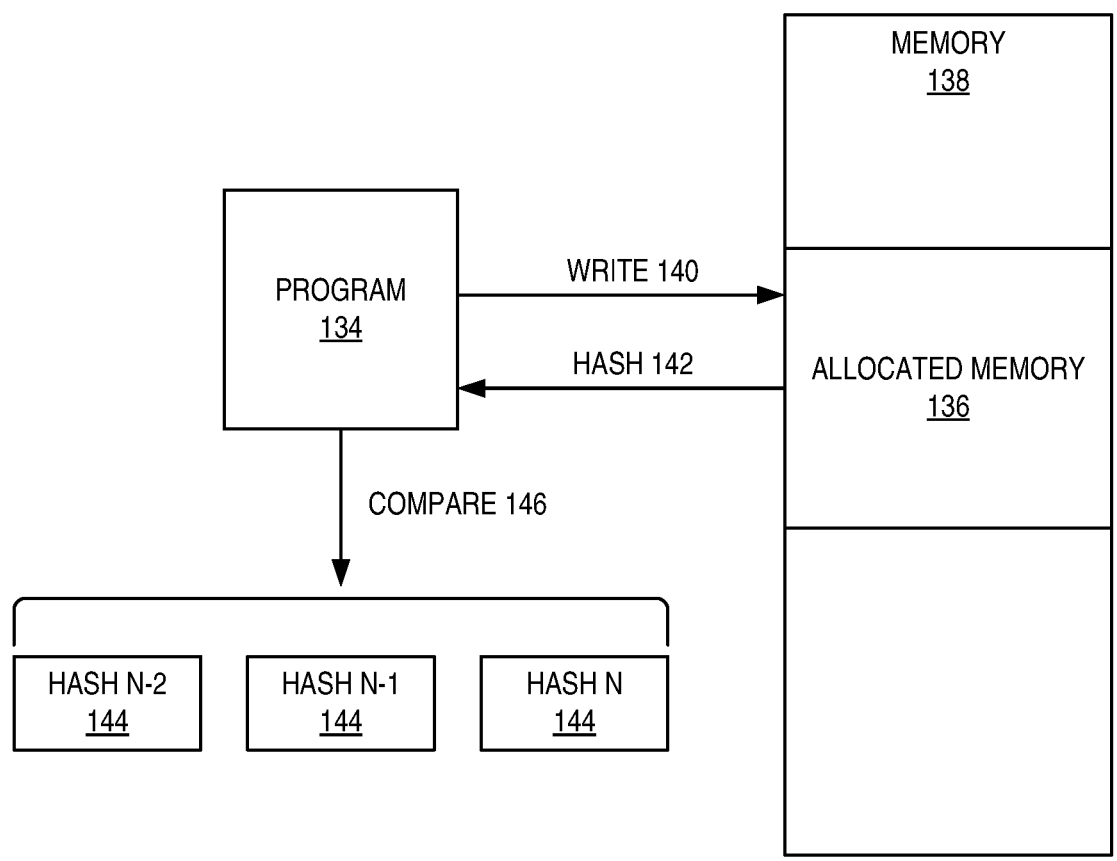
FIG. 9 is a diagram of a program that takes hashes of memory space at times when memory content is not expected to change.

FIG. 9 shows a computer program 134 that includes instructions that may be executed by a processor or a virtual processor/machine to implement the technique discussed above.

The program 134 accesses a region of allocated memory 136 of a general-purpose memory 138. The program writes 140 to allocated memory 136 to realize its functionality and computes 142 hashes 144 of the allocated memory 136 from time to time. Two or more hashes are computed at different times when the content of the allocated memory 136 is not expected to change. The program 134 compares time-adjacent hashes 144 and determines that unauthorized access the allocated memory 136 has occurred if the hashes 144 do not match. The program 134 continues its operations as long as hashes 144 match and may halt operation, raise an alert, or take other action.

Figure 10:
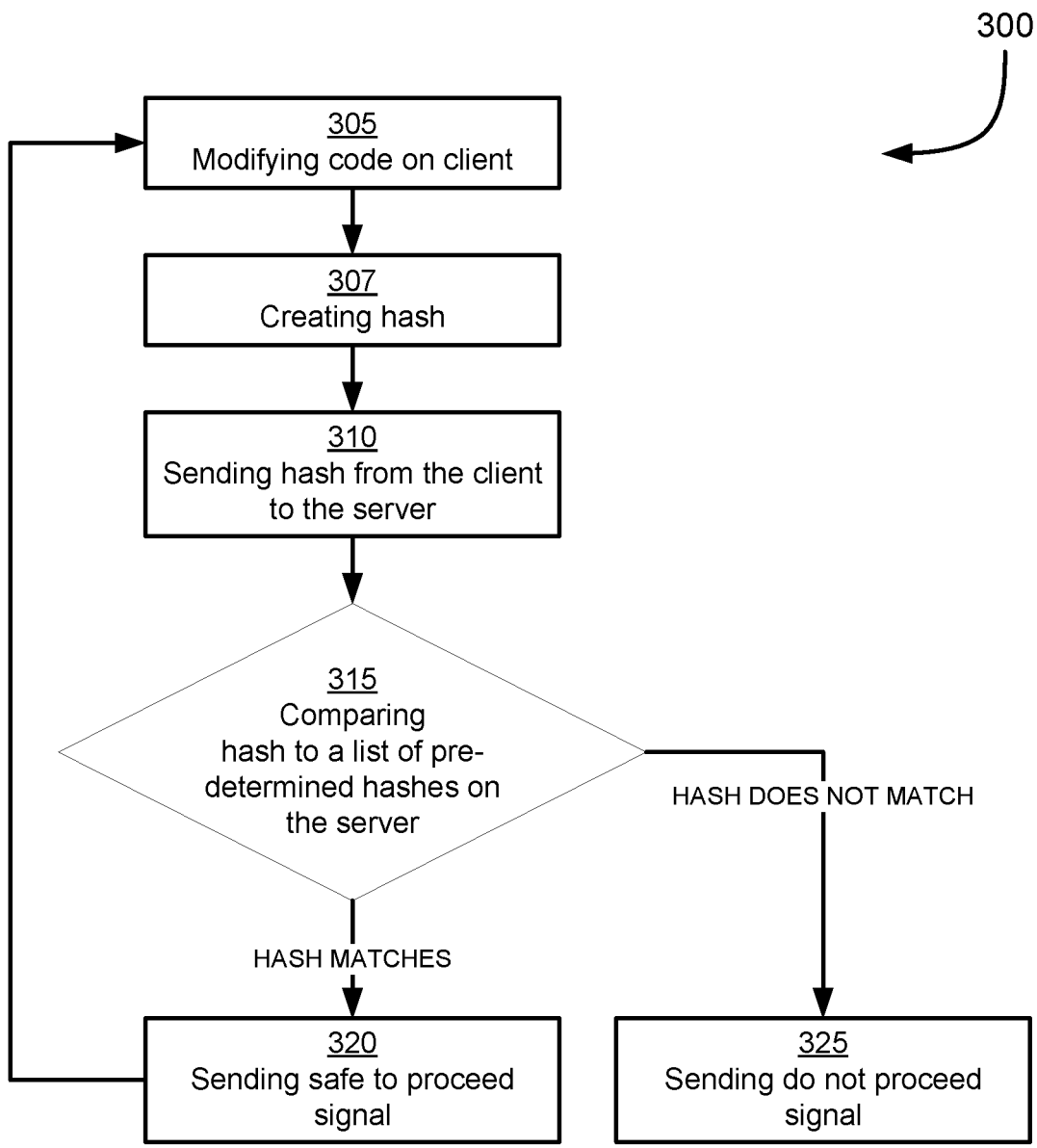
FIG. 10 is a flowchart of an example method of verifying software code using modified hashes.

FIG. 10 shows an example method 300 of verifying software code using modified hashes and is represented in the form of a flowchart. Method 300 can be performed using example system 10.

At block 305, software code on client device 18 is modified. The modifications (also known as mutations) will not impact the functionality of the software code itself and will not affect the user. Examples of modifications to the software code may include changing variable names, changing the spacing between lines of code, changing the calculation of variables that are not used and changing the order of functions within the code. The modification that is performed is chosen by the processor on the client device 18 at random. Once changes have been made, a hash is created from the software code at block 307. Hashes are distinct to the software code itself, and any changes that have been made to the software code would mean a new hash.

At block 310, the hash is sent from the client device to server 14. Server 14 may contain a predetermined list of hashes, based off of the original software code. The predetermined list of hashes can be calculated, or they can be obtained through simulation of the software code going through changes. For example, when generating the predetermined list of hashes, the software code could be simulated, and would then be modified in the simulation to replace a variable name throughout the software code. The hash would then be saved to server 14. Multiple different modifications would be simulated, and their corresponding hashes stored. This exercise would generate a list of hashes, which would then be able to be used for future verifications from client devices 18.

At block 315, the hash from the modified software code from client device 18 would then be compared to the predetermined list of hashes. If the hashes do not match, then at block X25, a negative response or a do not proceed signal is sent to the client device 18, indicating to client device not to proceed with any transactions, as the client device may have been tampered with. In the alternative, should the software code be spoofed, and there is an attacker 20 trying to get access to the system by pretending to be the original client device 18, then a negative response will be sent to the attacker 20, and the software would not proceed.

If the hashes do match, then at block 320 a positive response or a safe to proceed signal is sent to client device 18, and the software code continues to operate.

Figure 11:
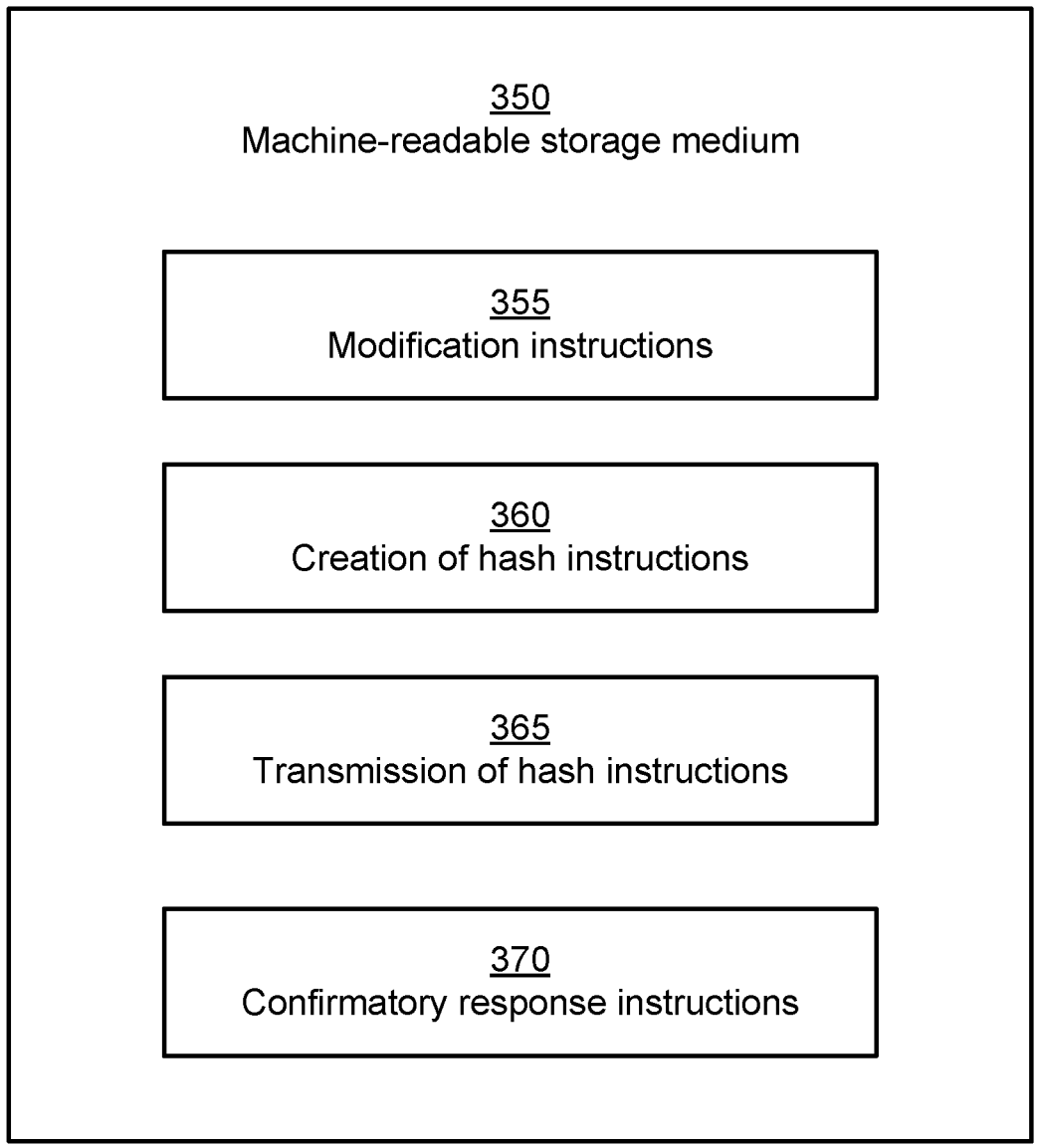
FIG. 11 is a diagram of machine readable storage medium for client devices operating the example method of FIG. 10.

FIG. 11 shows an example block diagram of a non-transitory machine-readable storage medium 350 storing machine-readable instructions for client device 18. In particular, the machine-readable instructions are executable by a processor on client device 18. Generally, the storage medium 350 stores instructions to cause a processor to execute an example method of verifying software code using modified hashes. Specifically, the storage medium 350 includes modification instructions 355, creation of hash instructions 360, transmission of hash instructions 365, and confirmatory response instructions 370.

The modification instructions 355 when executed, cause a processor to modify the software code in the client device 18. As indicated above, there are various examples of modification to the software code, and the type of modification is chosen at random.

The creation of hash instructions 360 when executed, cause a processor to create a hash out of the software code that has been modified. The transmission of hash instructions 365 when executed, cause a processor to send the hash instructions to server 14.

The confirmatory response instructions 370 when executed, cause a processor to analyze the response received from server 14. If a negative response is received, no action will be taken, and any pending transactions in the software may be halted. If a positive response is received, then pending transactions in the software will proceed. Until a response is received, any pending transactions in the software may be queued, but may not be processed.

Figure 12:
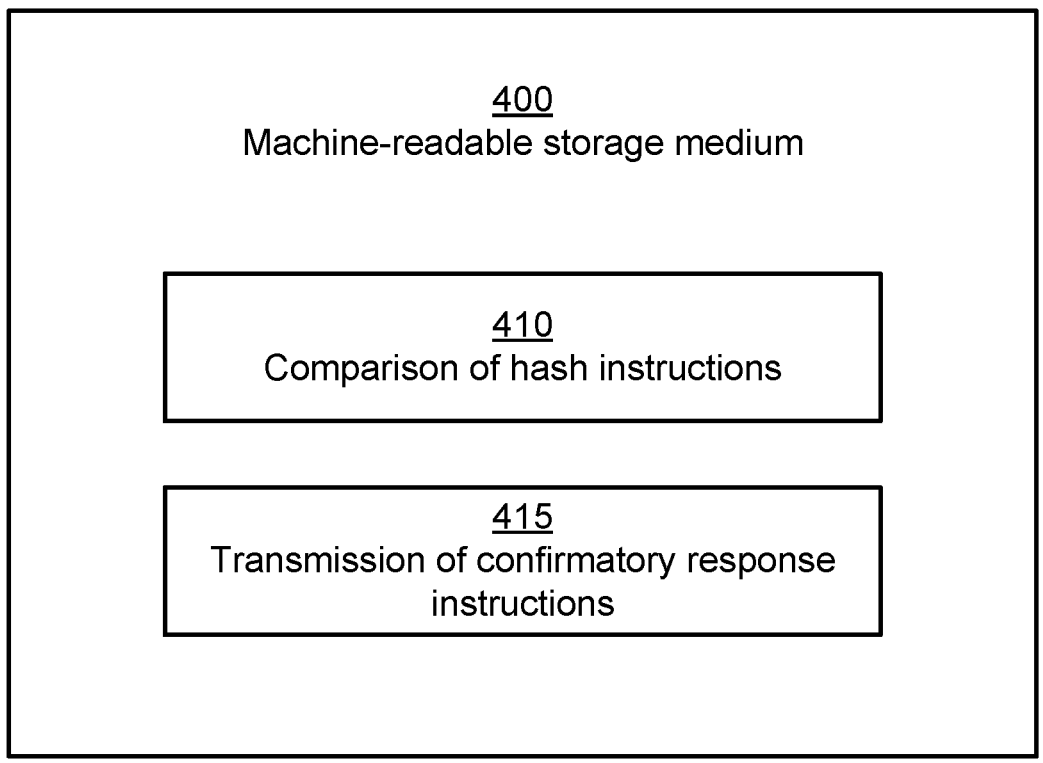
FIG. 12 is a diagram of machine readable storage medium for a server operating the example method of FIG. 10.

FIG. 12 shows an example block diagram of a non-transitory machine-readable storage medium 400 storing machine-readable instructions for server 14. In particular, the machine-readable instructions are executable by a processor on server 14. Generally storage medium 400 stores instructions to cause a processor to execute an example method of verifying software code using modified hashes. Specifically, storage medium 400 includes comparison of hash instructions 410 and transmission of confirmatory response instructions 415.

The comparison of hash instructions 410 when executed, cause a processor to take a received hash and compare it against the predetermined list of hashes. If there is a match, then a positive response is generated. If there is no match, then a negative response is generated. The response is sent by the processor when the transmission of confirmatory response instructions 415 is executed.

Figure 13:
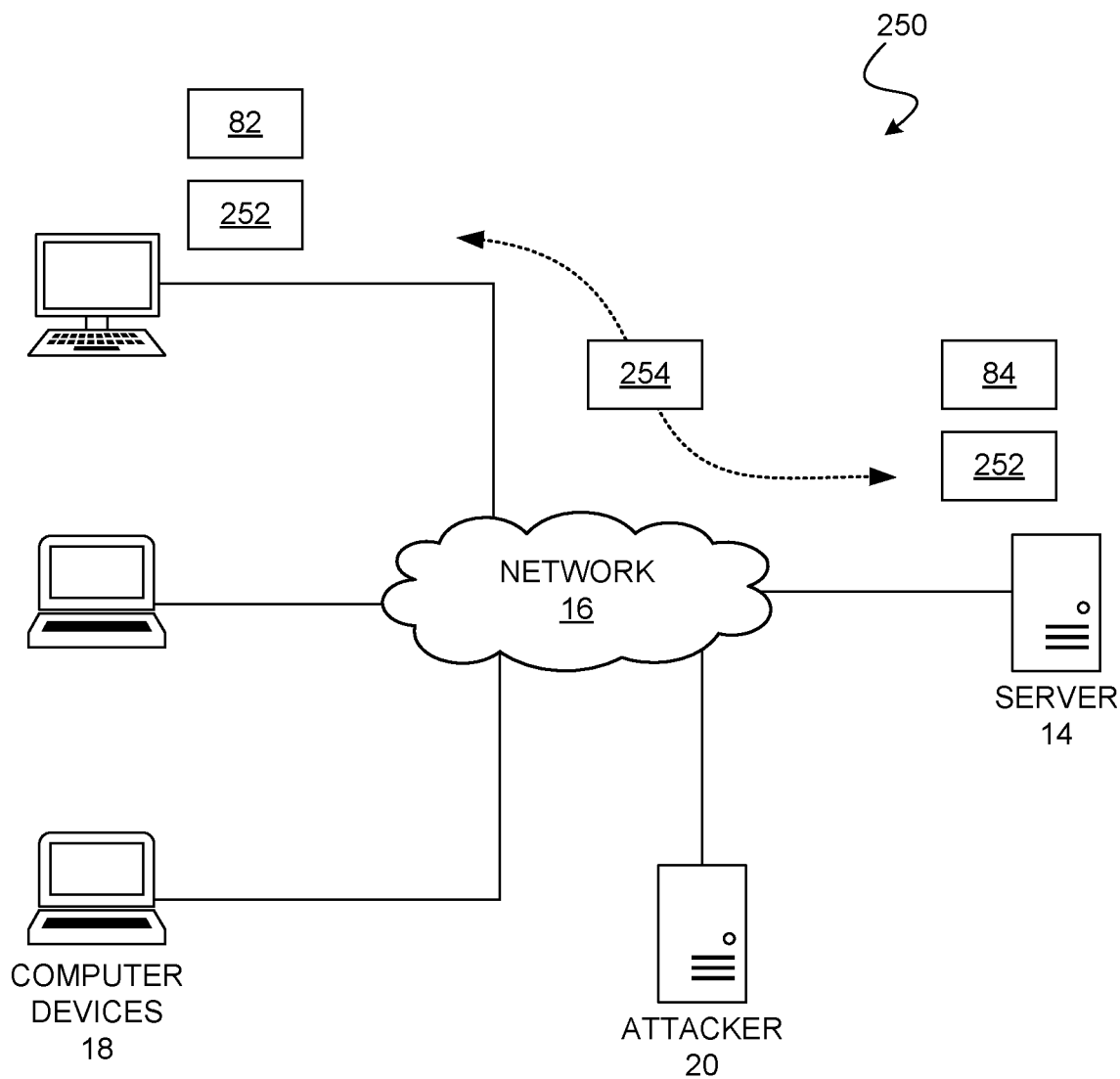
FIG. 13 is a diagram of a networked computer system, in which a client computer device and a server share knowledge about a changing set of variables.

FIG. 13 shows an example system 250. The system 250 is substantially the same as the system 10 of FIG. 6, except as discussed below.

A client computer device 18 operates a client-side computer program 82 and a server operates a server-side computer program 84. The programs 82, 84 cooperate to implement desired functionally, such as encrypted messaging or other functionality discussed elsewhere herein.

The programs 82, 84 share a set of variables 252. However, a larger set of variables 254 is used for communication between the programs. Moreover, a particular communication may only use a small subset of the larger set of variables 254. The programs 82, 84 share logic that controls the mapping of the larger set 254 to the actual variables used at any given time. Some of the larger set of variables 254 are not used by the programs 82, 84 to implement the functionality and may be assigned arbitrary values. An attacker 20 eavesdropping on communications between the computer device 18 and the server 14 may be confounded by seeing different variables used at different times with little apparent consistency or rationale behind their use.

Figure 14:
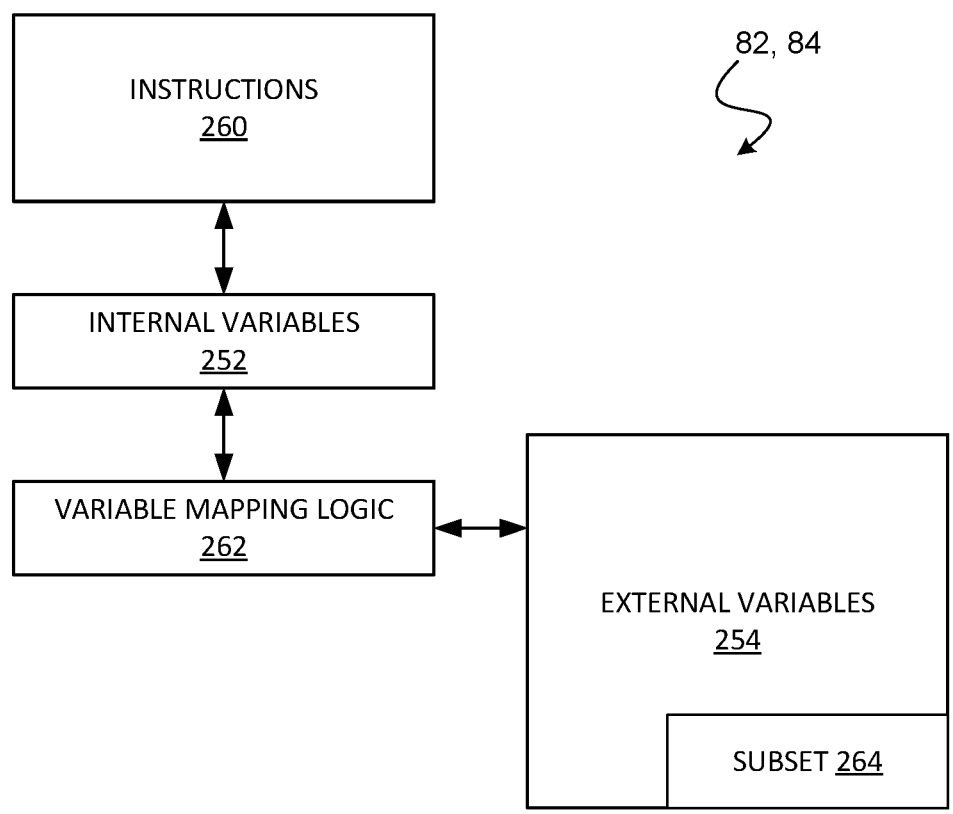
FIG. 14 is a diagram of a sets of internal and external variables and logic governing their association.

With reference to FIG. 14, a program 82, 84 includes core instructions 260 that implement the desired functionality. The program 82, 84 further includes variable mapping logic 262 that maps a larger set of external variables 254 to internal variables 252. External variables 254 are communicated via a computer network and therefore potentially exposed. Internal variables 252 are used by program 82, 84 to implement the desired end-user functionality of the program 82, 84.

For any given communication, a subset 264 of external variables 254 may be used. The variable mapping logic 262 controls the subset 264 of external variables 254 used for any given communication, as well as the mapping of the subset 264 of external variables 254 to the internal variables 252 expected by the instructions 260.

The internal variables 252 may be considered server variables in the case of the server-side computer program 84 and may be considered client variables in case of the client-side computer program 82. Server-side and client-side variables need not be the same and need not correspond to any degree. Rather, the server-side and client-side internal variables 252 are used by the respective instructions 260 of the respective program 84, 82 to implement the desired functionality.

The variable mapping logic 262 is similar in each of the programs 82, 84, in that the variable mapping logic 262 traverses the set of external variables 254 according to a predefined logic that is consistent between the programs 82, 84. In a simple example, the programs 82, 84 may both have internal variables X and Y, which are to be communicated. The variable mapping logic 262 can therefore dictate that external variables A and B are to communicate the values of internal variables X and Y. The variable mapping logic 262 can further be configured to assign X to A and assign Y to B for odd numbered communications and assign Y to A and X to B for even numbered communications. The variable mapping logic 262 can further assign an arbitrary value (e.g., a random or dummy value) to an external variable C for every communication. As such, an eavesdropper will not be able to readily tell what are the true values of X and Y unless it also knows whether the particular communication is odd or even. Further, the eavesdropper will not know how to handle variable C and may ascribe importance to it when none is warranted.

The variable mapping logic 262 may follow a deterministic pseudo-random pattern that is initialized by a seed. The seed may be shared between the programs 82, 84 during a secure exchange, such as a physically local communication or an out-of-band communication. An example deterministic pseudo-random pattern uses a communication session identifier to identify a subset 264 of external variables 254 as well as the mapping to the internal variables 252.

External variables 254 that at different times map to the same internal variable 252 may differ in name. As such, an attacker may identify two or more apparently different variables that the program 82, 84 actually considers to be the same.

Figure 15:
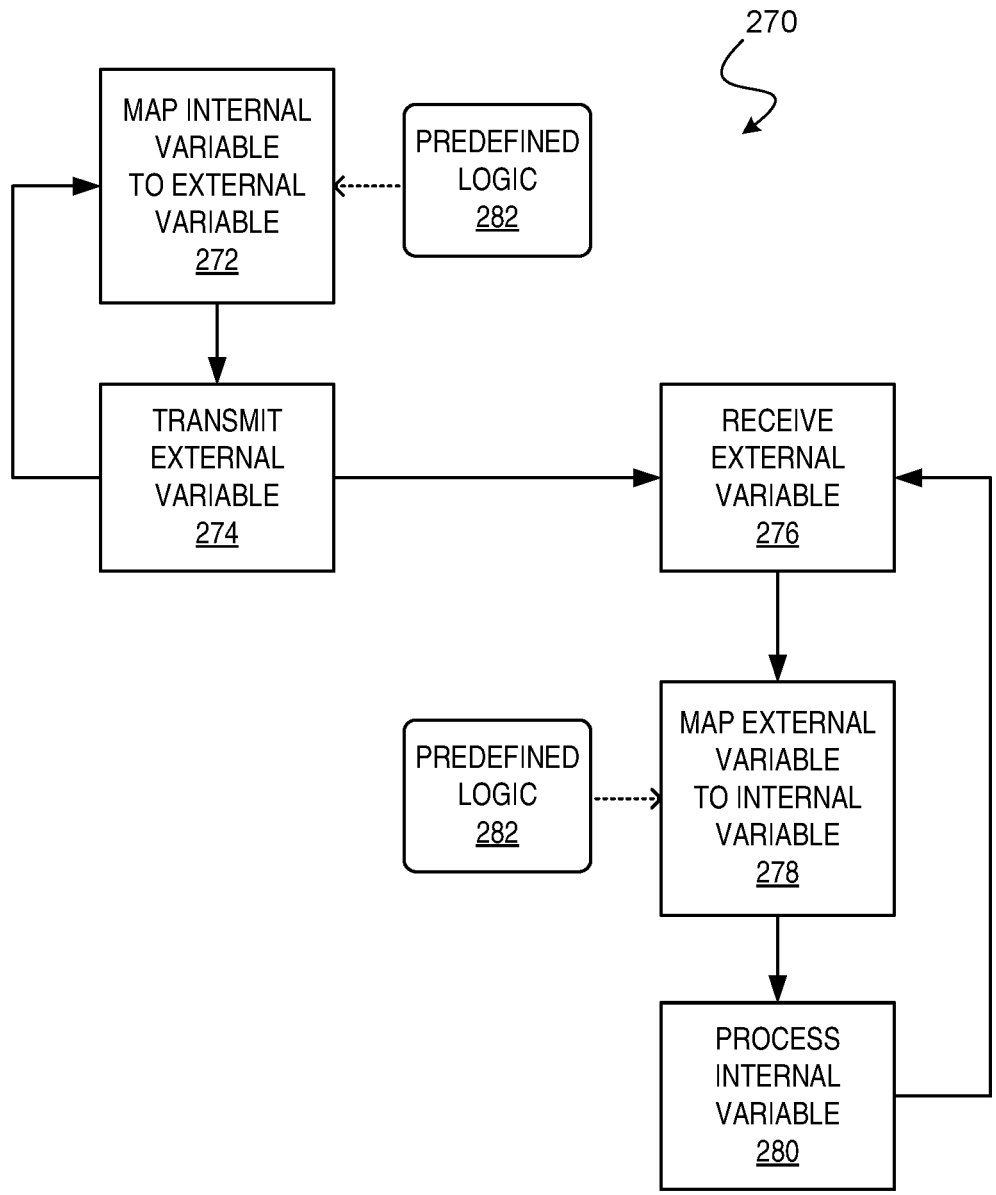
FIG. 15 is a flowchart of an example method of FIG. 14.

FIG. 15 shows a method 270 that implements this technique. The method 270 may be performed at a computer program 82, 84. The method 270 may be implemented by instructions stored at a non-transitory computer-readable medium and operable by a processor. Blocks 272, 274 are performed by the device performing the outgoing communication, whether that device is a client computer or a server. Blocks 276-280 are performed by the device performing the incoming communication, whether that device is a client computer or a server.

At block 272, an internal variable is mapped to an external variable according to a predefined logic 282.

At block 274, the external variable is communicated to the other device, via a computer network.

Blocks 272, 274 may be repeated indefinitely as a sequence of communications is made for first, second, and additional external variables. The same internal variable may be mapped and re-mapped to different external variables any number of times.

At block 276, the external variable is received by the device.

At block 278, the received external variable is mapped to an internal variable according to predefined logic 282, which may be the same as or correspond to the predefined logic that selected the external variable for transmission.

At block 280, the internal variable is used to perform an operation to carry out the desired functionality.

Blocks 277-280 may be repeated indefinitely as a sequence of communications is received. The same internal variable may be mapped and re-mapped to different external variables any number of times.

The method 270 is described with respect to unidirectional communications. However, the same or similar method 270 may be used for the opposing direction of communication to enable bidirectional communication.

Figure 16:
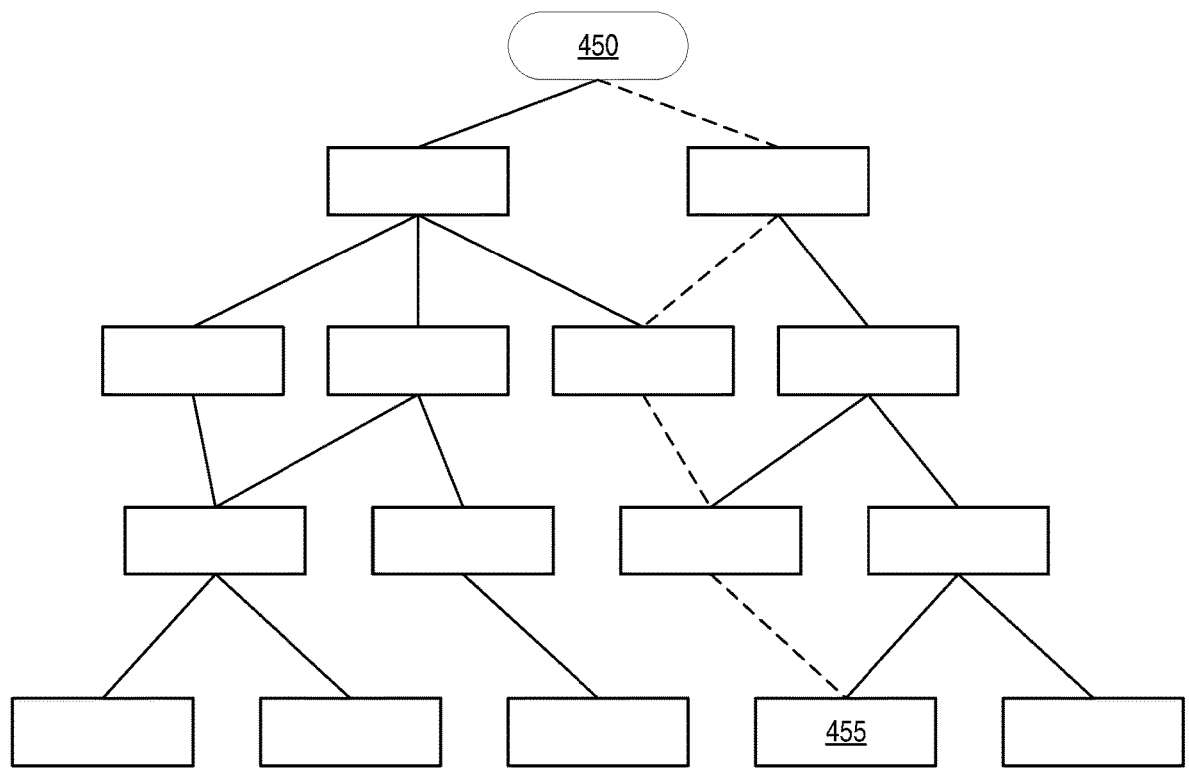
FIG. 16 is a diagram showing the structure of functions for obfuscating code.

FIG. 16 shows an example diagram of obfuscating software code by setting up a labyrinth of potential paths for the calculation of variables, where depending the use case, system flags, and the value of variables, either a correct value or an incorrect value may be returned, allowing for server 14 to determine whether or not the software code has been tampered with, or if attacker 20 is present.

The following is an example of the operation of obfuscating software code. Each block in FIG. 16 represents a function. Functions take in variables, change the variables according to the code in the function, and then provide an output of the variables with new values. Functions may also be limited in which other functions they pass variables to. In FIG. 16, the lines represent the possible paths in which functions can pass variables to other functions. The dotted lines represent the correct path that variables are passed, in which to get an expected result. Server 14 has an algorithm that can calculate the expected result based on a number of input variables.

When variables are available, they are run through the functions within the software code starting at block 450. As they progress through each function, depending on the environmental conditions surrounding the software, such as system flags, or particular use cases, the variables will be passed from one function to another until it reaches the end and no more calculations are possible. The results are then passed back to server 14 for verification.

If the results do not match the values calculated by server 14, then it is possible that attacker 20 is the computer that is running the software code, and has just returned incorrect values, as it is not running the same environmental conditions, system flags or use cases as computer devices 18.

If the variables are calculated correctly, and follow the dotted lines from block 450 to block 455, then the results would match server 14, and computer devices 18 are running software code that has not been tampered with, and there is no attacker 20 in the system.

Other embodiments of this form of obfuscation are available, and may not mimic the structure of the example structure in FIG. 16.

Various techniques discussed herein are particularly suitable for use with programs written in languages, such as JavaScript, that tend to have source code that may be readily obtained by an attacker.

Any of the techniques discussed herein may be used alone or in any suitable combination.

It should be recognized that features and aspects of the various examples provided above can be combined into further examples that also fall within the scope of the present disclosure. In addition, the figures are not to scale and may have size and shape exaggerated for illustrative purposes.

The invention claimed is:

1. A non-transitory computer readable medium comprising instructions to:

generate a plurality of different computer programs using intended code and a source of randomization, the plurality of different computer programs providing the same functionality, wherein the source of randomization comprises salting the intended code with randomness when compiling the code to obtain an instance of a computer program of the plurality of computer programs;

generate a plurality of keys using the plurality of computer programs, wherein each generated key is generated from a file of a respective computer program, wherein the generated keys accord to an asymmetric cryptographic scheme; and distribute the plurality of computer programs to different computer devices to provide for encrypted communications using the generated keys and the files of the plurality of computer programs as corresponding keys.

2. The non-transitory computer readable medium of claim 1, wherein the plurality of generated keys are public keys and wherein the plurality of computer programs are used as corresponding private keys.

3. The non-transitory computer readable medium of claim 1, wherein the source of randomization may introduce randomness to different instances of the computer program by randomizing an instruction set, randomizing function/variable names, adding dummy functions/variables, or modifying code without changing effect.

4. The non-transitory computer readable medium of claim 1, wherein the instructions are further to:
  generate a query using a public key of the asymmetric cryptographic scheme;
  send the query to an instance of a computer program of the plurality of computer programs, wherein the instance of a computer program responds to the query using itself as a private key corresponding to the public key used to generate the query; and
  if the program instance cannot properly respond to the query, determine that the program instance has been compromised and can no longer be trusted.

5. A server comprising a processor configured to:
  generate a plurality of different computer programs using intended code and a source of randomization, the plurality of different computer programs providing the same functionality, wherein the source of randomization comprises salting the intended code with randomness when compiling the code to obtain an instance of a computer program of the plurality of computer programs;
  generate a plurality of keys using the plurality of computer programs, wherein each generated key is generated from a file of a respective computer program, wherein the generated keys accord to an asymmetric cryptographic scheme; and
  distribute the plurality of computer programs to different computer devices to provide for encrypted communications using the generated keys and the files of the plurality of computer programs as corresponding keys.

6. A non-transitory computer readable medium comprising instructions to:
  generate a plurality of different computer programs using intended code and a source of randomization, the plurality of different computer programs providing the same functionality;
  generate a plurality of keys using the plurality of computer programs, wherein each generated key is generated from a file of a respective computer program, wherein the generated keys accord to an asymmetric cryptographic scheme; and
  distribute the plurality of computer programs to different computer devices to provide for encrypted communications using the generated keys and the files of the plurality of computer programs as corresponding keys;
  generate a query using a public key of the asymmetric cryptographic scheme;
  send the query to an instance of a computer program of the plurality of computer programs, wherein the instance of a computer program responds to the query using itself as a private key corresponding to the public key used to generate the query; and
  if the program instance cannot properly respond to the query, determine that the program instance has been compromised and can no longer be trusted.

7. The non-transitory computer readable medium of claim 6, wherein the plurality of generated keys are public keys and wherein the plurality of computer programs are used as corresponding private keys.

8. The non-transitory computer readable medium of claim 6, wherein the source of randomization may introduce randomness to different instances of the computer program by randomizing an instruction set, randomizing function/variable names, adding dummy functions/variables, or modifying code without changing effect.

* * * * *